(12) United States Patent
Nagasawa

(10) Patent No.: US 6,564,433 B2
(45) Date of Patent: May 20, 2003

(54) CLIP FOR ATTACHING COVER MEMBER AND STRUCTURE FOR ATTACHING THE COVER MEMBER

(75) Inventor: Norimasa Nagasawa, Hiroshima (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/050,891

(22) Filed: Jan. 18, 2002

(65) Prior Publication Data
US 2002/0101096 A1 Aug. 1, 2002

(30) Foreign Application Priority Data
Jan. 29, 2001 (JP) ........................................ 2001-019787

(51) Int. Cl.[7] .......................... A44B 17/00; F16B 13/04; B60R 13/04
(52) U.S. Cl. ............................. 24/297; 24/289; 24/291; 24/292; 411/508
(58) Field of Search .......................... 24/297, 289, 291, 24/292; 411/508

(56) References Cited

U.S. PATENT DOCUMENTS

| 3,889,320 A | * | 6/1975 | Koscik ........................ 24/297 |
| 4,470,178 A | * | 9/1984 | Matsui ........................ 24/289 |
| 4,579,478 A | * | 4/1986 | Takahashi .................... 24/297 |
| 5,096,753 A | * | 3/1992 | McCue et al. ................ 24/297 |
| 5,202,172 A | * | 4/1993 | Graf ........................... 24/297 |
| 5,513,934 A | * | 5/1996 | German ....................... 411/508 |
| 5,876,084 A | * | 3/1999 | Smith et al. ................. 24/293 |
| 6,079,084 A | * | 6/2000 | Gwynn ........................ 24/295 |

FOREIGN PATENT DOCUMENTS

JP 8-72630 3/1996

* cited by examiner

*Primary Examiner*—Victor Sakran
(74) *Attorney, Agent, or Firm*—Kanesaka & Takeuchi (57) ABSTRACT

A clip for attaching a cover member to cover a groove section includes a base plate attached to a bottom surface of the groove section, a pair of engaging sections projected from the base plate and engaging side engaging sections of the cover member, and an abutting piece section projected from the base plate and having a free end abutting against an inner surface of the cover member to restrain an excessive movement thereof. In the condition that the cover member is attached, a spring force of the free end is applied to the cover member so that friction between the cover member and the engaging sections of the clip at both sides of the trim is effectively increased. Accordingly, the trim can be held in the width direction without loosening.

5 Claims, 6 Drawing Sheets

CLIP FOR ATTACHING COVER MEMBER AND STRUCTURE FOR ATTACHING THE COVER MEMBER

BACKGROUND OF THE INVENTION AND RELATED ART STATEMENT

The present invention relates to a clip for attaching a cover member or trim and a structure for attaching the cover member.

In a vehicle, such as an automobile, and a building or the like, there is a structure that a groove section is formed and extended in a member to which the cover member is mounted (a roof, a side body, a door, a wall or the like), and the cover member or trim is held by a clip fixed at a bottom surface of the groove section, so that the groove section is covered by the cover member. In the structure for attaching the cover member described above, the cover member generally has a substantially C-shape in section, and a cover member side engaging section is formed at a longitudinal opening of the cover member.

Using this characteristics, as disclosed in Japanese Patent Publication (KOKAI) No. 8-72630, the clip may include a base plate fixed to the bottom surface of the groove section formed in the member to which the cover member is mounted, a pair of engaging sections projected from the base plate to engage the cover member side engaging sections, and an abutting piece section projected from the base plate and elastically abutting against a central portion of a top inner surface of the cover member in a width direction. Accordingly, by engaging the cover member side engaging section of the cover member with the engaging sections of the clip, the cover member is fixed tightly to the base plate, so that the loosening in the accessing and separating directions is restrained by an urging force attributed to the abutting piece section. At the same time, the cover member is prevented from disengaging from the clip, that is, the cover member is constantly fixed to the member to which the cover member is mounted.

The aforementioned cover member is generally provided with lip members, which are made of an elastic material and disposed at both sides of the cover member in the width direction. The lip members elastically abut against the inside wall of the groove section to prevent the cover member from loosening inside the groove section (including a mode in which the cover member is partly displaced and rotated in accordance therewith) in the width direction of the cover member (a width direction of the groove section). As a deformation of the lip members absorbs excessive movements of the cover member in the width direction, the lip members may corrugate or lie outside the groove section. To solve this problem, the lip members may be omitted from the cover member.

However, if the lip members are omitted from the cover member, only the friction between the side engaging sections of the cover member and the engaging section of the clip due to the urging force of the abutting piece section is a force for preventing the widthwise movement of the cover member in the groove section, and the movement of the cover member can not be effectively prevented by the friction described above.

The present invention has been made in view of the foregoing, and an object of the invention is to provide a clip and a structure for attaching a cover member, in which the cover member can be retained without an excessive movement of the cover member in the width direction regardless of the existence of the lip members at both sides of the cover member in the width direction.

Further objects and advantages of the invention will be apparent from the following description of the invention.

SUMMARY OF THE INVENTION

To achieve the aforementioned object, the first aspect of the invention provides a clip for attaching a cover member or trim for covering a groove section. The clip comprises a base plate to be attached to the groove section; a pair of engaging sections projected from the base plate and engaging trim side engaging sections at both sides of the trim in a width direction thereof; and an abutting piece section projected from the base plate and elastically abutting against an inner surface of a top wall of the trim in a condition that a movement of the trim in a direction away from the base plate is regulated by the engagement between the trim side engaging sections and a pair of the engaging sections. The abutting piece section includes free ends, which respectively abut against the inner surface of the top wall of the trim at both sides of the trim in the width direction thereof, as means of abutting against the inner surface of the top wall of the trim.

The second aspect of the invention provides a structure for attaching a trim for covering a groove section by a clip attached to the groove section formed in a member to which the trim is mounted. The clip comprises a base plate attached to a bottom surface of the groove section; a pair of engaging sections projected from the base plate and engaging trim side engaging sections at both sides of the trim in the width direction thereof; and an abutting piece section projected from the base plate and elastically abutting against the inner surface of the top wall of the trim in a condition that a movement of the trim in a direction away from the base plate is regulated by the engagement between the trim side engaging sections and a pair of the engaging sections. The abutting piece section includes free ends, which respectively abut against the inner surface of the top wall of the trim at both sides of the trim in the width direction thereof, as means of abutting the inner surface of the top wall of the trim.

The third aspect of the invention provides a structure for attaching the trim by a plurality of clips, which is disposed sequentially in an extending direction of a groove section with an interval therebetween, to the groove section formed in a member to which a trim is mounted so that the trim for covering the groove section is held by means of a plurality of clips. In the structure for attaching the trim by a plurality of clips described above, each clip comprises a base plate attached to a bottom surface of the groove section; an engaging section projected from the base plate and engaging the trim side engaging section; and an abutting piece section projected from the base plate and elastically abutting against the inner surface of the top wall of the trim under a condition that a movement of the trim in a direction away from the base plate is regulated by the engagement between the trim side engaging section and the engaging section. The abutting piece section constitutes a single engaging section, and each of the engaging sections engages sequentially and alternately to the trim side engaging section at both the sides of the trim in the width direction.

Each clip has one engaging section, and the engaging sections of the respective clips are disposed sequentially and alternately to engage the trim side engaging sections at both sides of the trim in the width direction. The abutting piece section includes a free end as means of abutting against the inner surface of the top wall of the trim, and the free end abuts against the inner surface of the top wall of the trim at a side where the engaging section of the clip exists.

According to the first aspect of the invention, the abutting piece section has the free end for abutting the inner surface of the top wall of the trim at both sides of the trim in the width direction. Therefore, a spring force of the free end is applied to the trim at a position closer to the engaging section as opposed to a center portion of the trim in the width direction. Thus, an engaging force (frictional force) between the trim side engaging sections and the engaging sections at both sides of the trim in the width direction is effectively increased. Accordingly, regardless of the existence of the lip members at both sides of the trim in the width direction, the trim can be tightly held without loosening in the width direction.

Also, when the top wall of the trim is inclined by using a pair of the engaging sections with different projection heights, the deformation of the free end can be easily adjusted by changing inclination postures of the respective free ends. The engaging force between the trim side engaging section and the engaging section of the clip can be substantially equal at both sides of the trim in the width direction.

The free end for abutting against one side of the trim in the width direction may extend closer to one engaging section for abutting against the trim side engaging section at one side of the trim in the width direction, and the free end for abutting against the other side of the trim in the width direction may extend closer to the other engaging section for engaging the trim side engaging section at the other side of the trim in the width direction. In this aspect, a spring force of the free end is applied to the trim at a position closer to the engaging section as opposed to a center portion of the trim in the width direction. Thus, the engaging force (frictional force) between the trim side engaging sections and the engaging sections at both sides of the trim in the width direction is further increased.

The abutting piece section may be formed of a pair of abutting piece sections disposed to sandwich a pair of the engaging sections therebetween. One of the abutting piece engaging sections has a free end that extends toward one engaging section side from the other engaging section side to thereby abut against one side of the trim in the width direction. The other abutting piece section constitutes a free end that extends from one engaging section side toward the other engaging section side to thereby abut against the other side of the trim in the width direction. In this aspect, the spring forces of a pair of the free ends effectively enhance the engagement between the trim side engaging sections and the engaging sections of the clip at both sides of the trim in the width direction.

Also, the abutting piece section may include a leg and a pair of free ends. One of the free ends abuts against one side of the trim in the width direction, and the other free end abuts against the other side of the trim in the width direction. Therefore, by means of the abutting piece section with a pair of the free ends, an increased spring force can be applied to both sides of the trim in the width direction.

A pair of the engaging sections may be disposed with an interval therebetween. Additionally, in an arranging direction of a pair of the engaging sections, a thickness of the trim is larger than a gap between one of the engaging sections and the free end abutting against one side of the trim in the width direction, and also larger than a gap between the other engaging section and the free end abutting against the other side of the trim in the width direction. Therefore, both sides of the trim in the width direction will not be inserted into a gap between the engaging sections and the free ends, to thereby prevent a trim from being attached incorrectly.

A projecting length of one of the engaging sections may be longer than that of the other engaging section. Furthermore, one free end for abutting one side of the trim has an increased inclination posture as compared with the other free end. Therefore, the trim can be disposed to be inclined, and the engaging force between the trim side engaging section and the engaging section can be still approximately identical at both sides of the trim in the width direction.

According to the second aspect of the invention, the trim is mounted to the member using the clip according to the first aspect of the invention. Regardless of the presence of the lip members at both sides of the trim in the width direction, the trim is attached to the member without wobbling in the width direction.

Further, as an example of modifications, each clip may include only one engaging section, and the engaging sections of the clips may sequentially and alternately engage the trim side engaging sections at both sides of the trim in the width direction. The abutting piece section of each clip may include the free end as means for abutting against the inner surface of the top wall of the trim, and the free end abuts against the inner surface of the top wall of the trim at the side, in which the engaging section of the clip exists, between both sides of the trim in the width direction. Therefore, when the clip members can not be provided at both sides of the trim in the width direction as a plurality of clips is linked, the trim can be held at the member to which a trim is mounted without wobbling in the width direction of the trim. Accordingly, each clip needs only one engaging section and one free end, and an amount of material used for each clip can be reduced.

Also, the member to which the trim is mounted may be a roof of an automobile, and the trim may be a roof trim for the automobile. Thus, in the case the roof trim is attached to the roof of the automobile, the trim can be attached without wobbling in the width direction thereof.

DETAILED DESCRIPTION OF PREFERRED EMBODIMENTS

Figure 1:
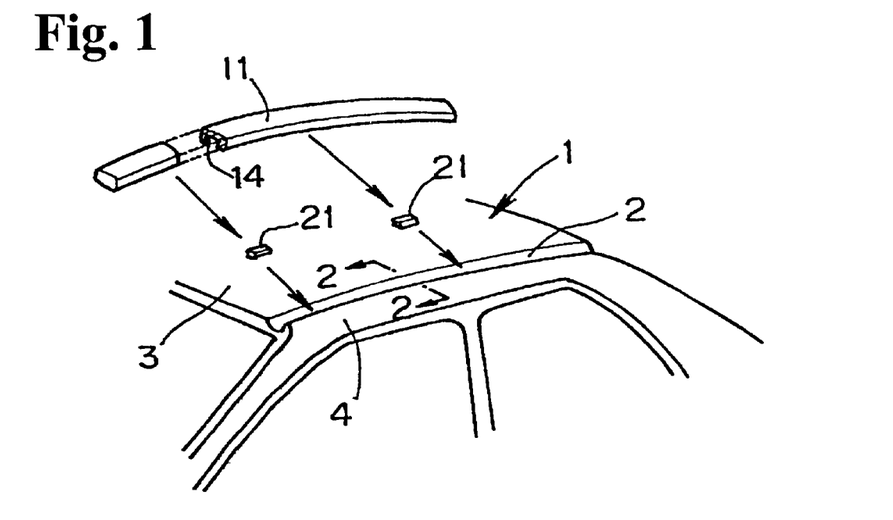
FIG. 1 is an exploded perspective view of a main part showing a roof section of an automobile to which the present invention is applied.

Hereunder, embodiments of the invention will be explained with reference to the accompanying drawings. In FIG. 1, numeral reference 1 denotes a roof of an automobile as a member to which a trim is mounted, and a groove section 2 is formed at an end section of a the roof in the width direction extending throughout an entire length thereof in the front and rear directions. The groove section 2 is covered by a roof trim or cover member 11 extending in the front and rear directions, and the roof trim 11 is fixed to the roof 1 by a plurality of clips 21 shown in FIG. 1. Incidentally, a structure for attaching the roof trim 11 described below is structured symmetrically at a right and a left end section of the roof 1.

Figure 2:
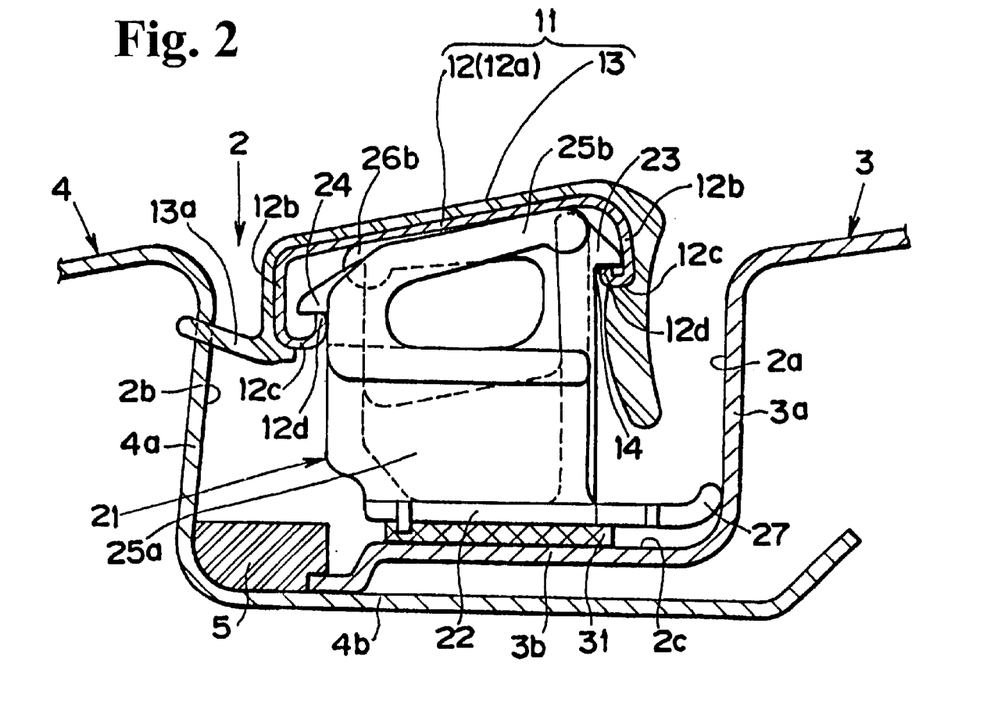
FIG. 2 is an enlarged sectional vied taken along line 2—2 in FIG. 1 showing the first embodiment of the invention.
Figure 3:
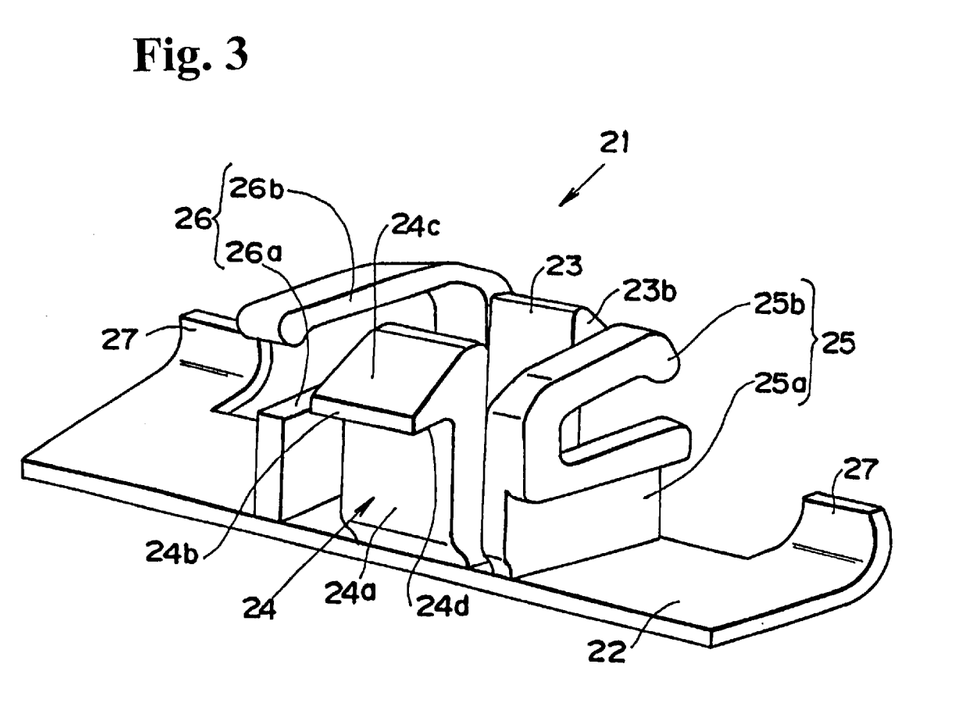
FIG. 3 is a perspective view showing a clip according to the first embodiment of the invention.
Figure 4:
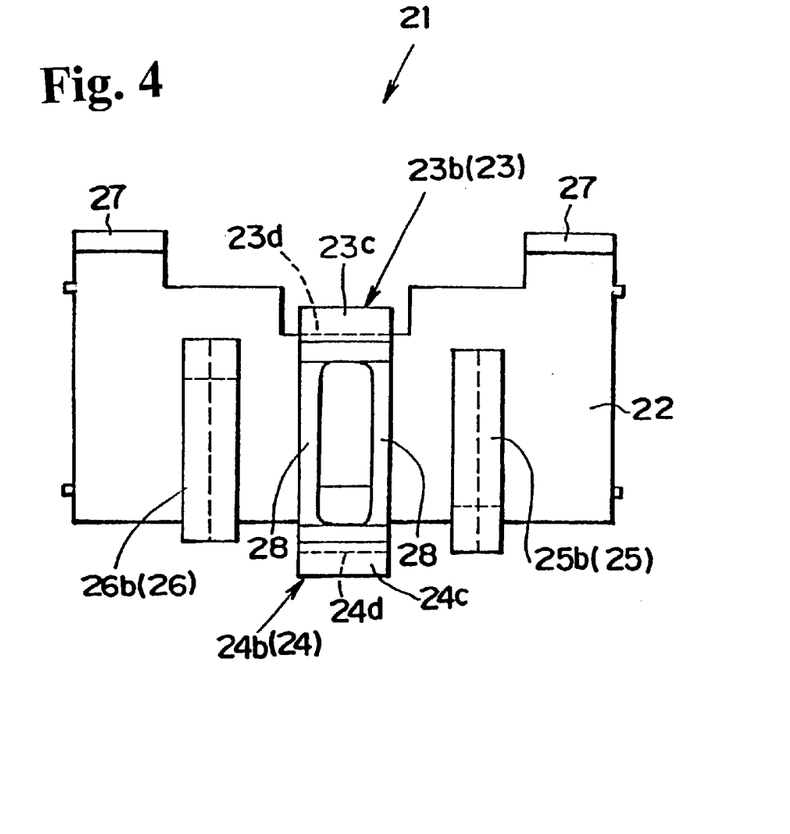
FIG. 4 is a plan view of the clip according to the first embodiment of the invention.
Figure 5:
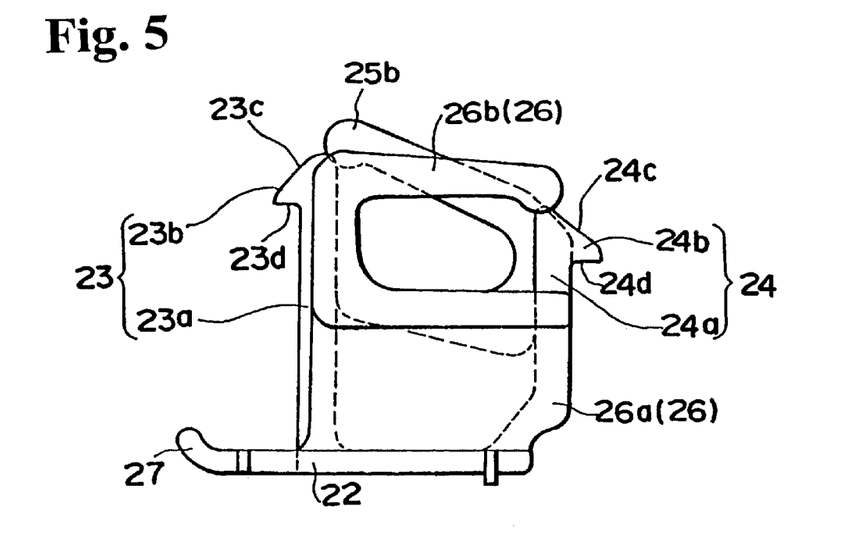
FIG. 5 is a left side view of the clip shown in FIG. 4.
Figure 6:
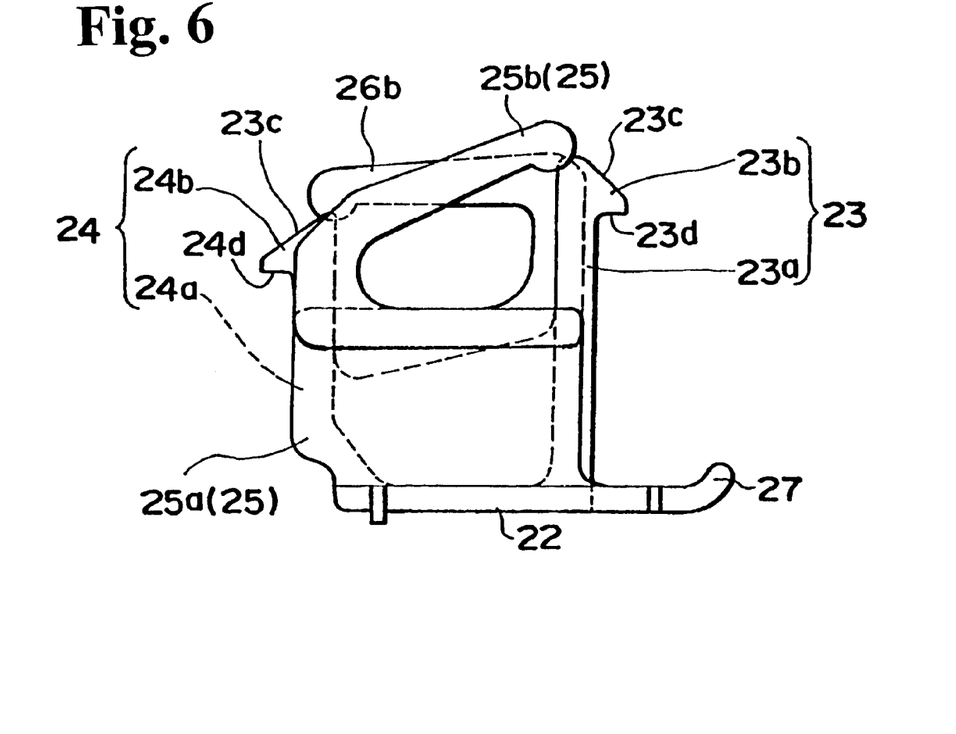
FIG. 6 is a right side view of the clip shown in FIG. 4.
Figure 7:
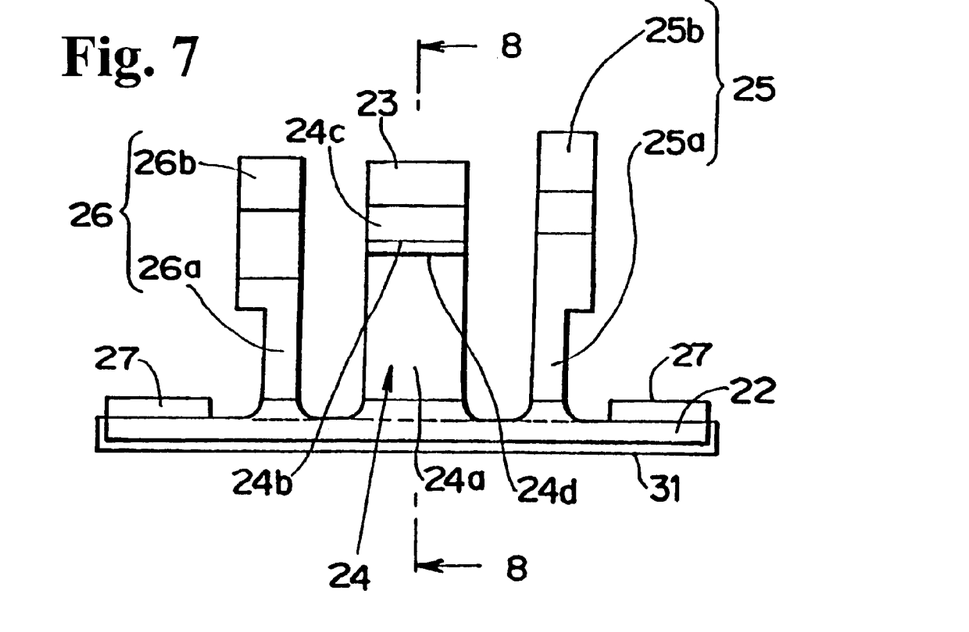
FIG. 7 is a front view of the clip shown in FIG. 4.
Figure 8:
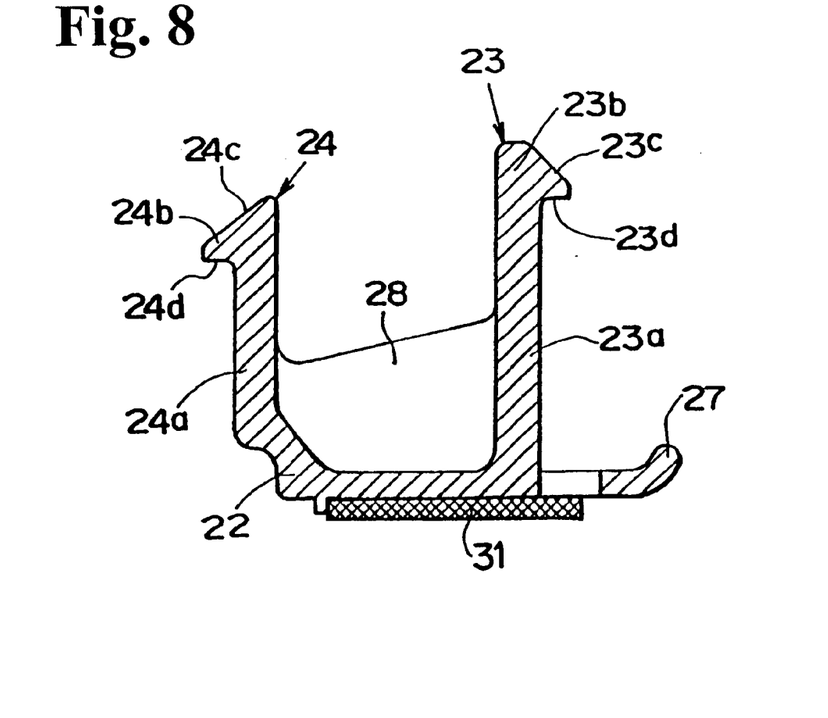
FIG. 8 is a cross sectional view taken along line 8—8 in FIG. 7.

A substantially entire portion of the roof 1 except the width end section is formed of a roof panel 3, and the width end section of the roof 1 is formed of an upper end portion of side panels 4. As shown in FIG. 2, the groove section 2 is formed of a connecting section of the roof panel 3 and the side panel 4. More specifically, a sidewall section 2a in the width direction inner side of the groove section 2 is formed of a downwardly extending wall section 3a that is formed by bending an end portion of the roof panel 3 downwardly. A sidewall section 2b of the groove section 2 in the width direction outer side is formed of a downwardly extending wall section 4a formed by bending an end portion of the side panel 4. A bottom wall section 2c of the groove section 2 is formed of horizontal wall sections 3b and 4b, which extend substantially horizontally. In this case, the horizontal wall sections 3b and 4b are overlapped and welded by a predetermined length thereof with each other in the vertical direction. A connecting section between the horizontal wall sections 3b and 4b is provided with a sealing member 5, and the sealing member 5 seals the connecting section between the horizontal wall sections 3b and 4b.

The structure of the clip 21 will be explained with reference to FIGS. 2 to 8. The clip 21 includes a base plate 22, a pair of engaging sections 23 and 24, a pair of abutting piece sections 25 and 26, and a pair of positioning sections 27. The clip 21 is integrally molded as one unit by a synthetic resin (by injection molding).

The base plate 22 is a flat elongated thin plate (in the embodiment, a width thereof is about 16 mm, and a length thereof is about 30 mm) as a whole, and the base plate 22 is attached to the roof 1 while the longitudinal direction thereof (right and left directions in FIG. 4) is aligned along an extending direction (front and rear directions in FIG. 4) of the groove section 2. Namely, with a double-side adhesive tape 31 bonded on a bottom surface of the base plate 22 in advance, the base plate 22 is attached to the bottom wall section 2c of the groove section 2.

A pair of the engaging sections 23 and 24 is projected upwardly from the upper surface of the base plate 22. The projecting positions of the engaging sections 23 and 24 are located around the center of the longitudinal direction of the base plate 22 and close to end portions in the width direction (the vertical direction in FIG. 4) of the base plate 22. One engaging section 23 is located at one side (right side in FIG. 6) of the width direction of the base plate 22, and projected higher than the other engaging section 24 located at the other side (left side in FIG. 6) of the width direction of the base plate 22. The engaging sections 23 and 24 are extended (about 5 mm in the embodiment) in the longitudinal direction of the base plate 22 by a length shorter than the length of the base plate 22 in the longitudinal direction. The engaging section 23 (24) includes a pillar section 23a (24a) extending upwardly straight, and a stopper section 23b (24b) projecting from the upper end of the pillar section 23a (24a) toward an outer side in the width direction of the base plate 22. The stopper section 23b (24b) includes an inclined surface 23c (24c) and a substantially horizontal engaging surface 23d (24d). A pair of the inclined surfaces 23c and 24c is separated gradually away from each other toward a lower side. A pair of ribs 28 is integrally provided between the engaging sections 23 and 24. The rib 28 is disposed at a lower portion of the pillar sections 23a and 24a of the engaging sections 23 and 24, and regulates bending of the lower portions of the pillar sections 23a and 24a in the width direction.

A pair of the abutting piece sections 25 and 26 is projected upwardly from the upper surface of the base plate 22. The abutting piece sections 25 and 26 are formed to sandwich a pair of the engaging sections 23 and 24 therebetween in the longitudinal direction of the base plate 22. Each of the abutting piece sections 25 and 26 includes a leg section 25a (26a), which stands while extending astride the engaging sections 23 and 24, and a free end 25b (26b) provided at an upper portion of the leg section 25a (26a) to be deformable elastically in the vertical direction. The free end 25b of the abutting piece section 25 forms a bendable space between the free end 25b and the leg section 25a, and extends such that it is inclined upwardly toward one side of the base plate from the other side of the base plate 22 in the width direction. The free end 26b of the abutting piece section 26 forms a bendable space between the free end 26b and the leg section 26a, and extends horizontally from one side of the base plate 22 toward the other side of the base plate 22 in the width direction. In a state that an external force is not applied on the free end, a distal end of the free end 25b is located at a position by a predetermined length higher than the engaging surface 23d of the engaging section 23, and a distal end of the free end 26b is located at a position higher by a predetermined length than the engaging surface 24d of the engaging section 24.

Also, the free end 25b is disposed such that a base end thereof is overlapped with the engaging section 24 in the width direction of the base plate 22, and a distal end thereof extends to reach the engaging section 23. Accordingly, in the width direction of the base plate 22, there is no gap between the free end 25b and the engaging section 23. Similarly, the free end 26b is disposed such that a base end thereof is overlapped with the engaging section 23 in the width direction of the base plate 22, and a distal end thereof extends to reach the engaging section 24. Accordingly, in the width direction of the base plate 22, there is no gap between the free end 26b and the engaging section 24.

In this case, the abutting piece sections 25 and 26 have such lengths or heights that when the abutting piece sections 25 and 26 are held between fingers of an operator to attach the clip 21 into the groove section 2, the fingers of the operator do not interfere with an opening end rim of the groove section 2, and the base plate 22 can be pressed against the bottom wall section 2c of the groove section 2 with a sufficient force.

A pair of the positioning sections 27 is formed at one side (inner end side of the width direction of a vehicle) of the base plate 22 in the width direction, and is located at the ends of the base plate 22 in the longitudinal direction. A distal end of each positioning section 27 is slightly curved upwardly toward one side of the width direction (inner side of the width direction).

A roof trim 11 will be explained with reference to FIG. 2. The roof trim 11 has a double layer structure of an inner trim 12 and an outer trim 13. The inner trim 12 is made of metal, such as an aluminum alloy, stainless steel, or a sufficiently rigid material, and the outer trim 13 is made of a hard or soft synthetic resin and the like which is softer than the inner trim 12. The inner trim 12 includes a top wall section 12a; a pair of right and left side wall sections extending downwardly from both end portions (right and left end portions in FIG. 2) of the top wall section 12a in the width direction; and a pair of right and left bottom wall sections 12c extending inwardly from lower end portions of the respective side wall sections. A distal end (free end) of each bottom wall section 12c constitutes a trim side engaging section 12d curved slightly upwardly. Then, a space between the trim side engaging sections 12d constitutes an attachment opening 14 (also refer to FIG. 1).

The outer trim 13 mainly covers the top wall section 12a and the side wall sections 12b, but does not cover portions corresponding to the trim side engaging sections 12d. In an aspect of the invention, the outer trim 13 integrally includes an outer lip member 13a made of a soft material. The outer lip member 13a has a tongue shape in section, and a distal end of the outer lip member 13a is set to elastically abut against the sidewall sections 2b in the condition that the lip member 13a is positioned inside the groove section 2.

In the structure as described above, the attachment of the roof trim 11 to the roof 1 is carried out by the following steps. Firstly, in the condition that upper end portions of the engaging sections 23, 24 in a pair are held between a thumb and an index finger or a middle finger of an operator, a strip on a lower surface of the double-sided adhesive tape 31 is peeled off, and then the clip 21 (the base plate 22 thereof) is bonded to the bottom wall section 2c of the groove section 2. At this time, while the positioning sections 27 are allowed to abut against the 2 sidewall section 2a at the inner side of the groove section 2, the downward pressing force for bonding is added thereto, so that the clip 21 is bonded precisely at a predetermined position.

The bonding of the clip 21 to the roof 1 can be carried out after a coating (final coating) to the vehicle body. The clip 21 may also be attached to the roof 1 in the middle of the coating steps. The double side adhesive tape 31 may be formed of a thermosetting resin, so that a curing of the resin can be completed by a heat of the coating and drying steps. More specifically, the clip may be bonded to the roof 1 between a drying step of an intermediate coat and an application step of an over coat. Accordingly, during the drying step of the over coat, the clip is strongly bonded to the roof 1 by a high heat in a drying path (in this case, the over coat is also applied to the clip).

Then, as shown in FIG. 2, the roof trim 11 is pushed into the groove section 2, and a pair of engaging sections 23 and 24 of the clip 21 engages the trim side engaging sections 12d at both sides of the roof trim 11 in the width direction, to thereby complete the mounting. When each engaging section 23 (24) engages the engaging section 12d, the attachment opening 14 of the roof trim 11 is slightly expanded (elastically deformed) once by the inclined surfaces 23c and 24c. After the attachment opening 14 passes through the engaging sections 23 and 24, the space or interval of the attachment opening 14 is returned to the original state, and the trim side engaging sections 12d engage the lower surface of the engaging sections 23 and 24, i.e. the engaging surfaces 23d and 24d, to thereby prevent the trim from disengaging therefrom upwardly.

In this case, in the width direction of the base plate 22, there is no gap between the free end 25b and the engaging section 23, and between the free end 26b and the engaging section 24. Thus, the trim side engaging sections 12d will not be inserted incorrectly between the clip side engaging sections 23 and 24, eliminating misalignment.

In a condition that attaching the roof trim 11 is completed, the free end 25b (26b) of the clip 21 abuts against the inner surface of the top wall of the roof trim 11 while the free end 25b (26b) of the abutting piece section 25 (26) is elastically deformed downwardly. In this case, the distal end portion of the free end 25b (26b) reaches the engaging section 23 (24) in the width direction of the base plate 22, and mainly abuts against the inner surface of the top wall at one side of the roof trim 11 in the width direction. Accordingly, spring forces of both free ends 25b and 261) are applied closer to the engaging sections 23 and 24. As a result, the trim side engaging sections 12d are effectively pushed against the lower surfaces of the engaging sections 23 and 24. Thus, the engagement between the trim side engaging section 12d and the engaging sections 23 and 24 become stronger, and relative movements or displacement of the roof trim 11 are restrained not only in the vertical direction with respect to the clip 21 but also in the width direction. Therefore, in the embodiment of the invention, although the roof trim 11 has the outer lip member 13a, the outer lip member 13a will not be corrugated or lie outside the groove section 2.

In this case, in order to be aligned along the roof 1 as much as possible, the roof trim 11 is inclined by the engaging sections 23 and 24 with different heights. However, since the free end 25b is inclined so as to increase the height thereof in accordance with the height of the engaging section 23, the respective engagement forces of the trim side engaging sections 12d relative to the engaging sections 23 and 24 are substantially equally high at both sides of the roof trim 11 in the width direction.

Figure 9:
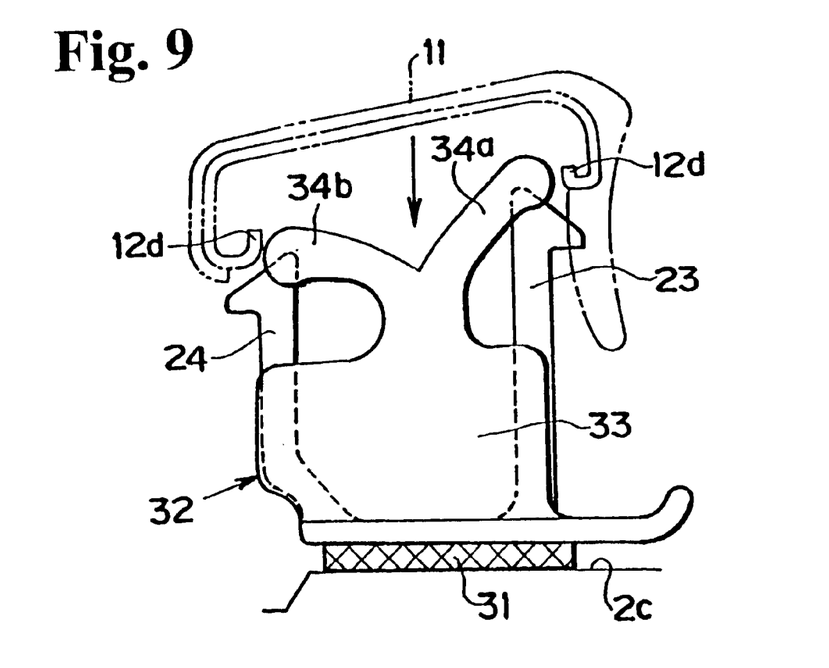
FIG. 9 is a view for explaining a clip according to the second embodiment of the invention.
Figure 10:
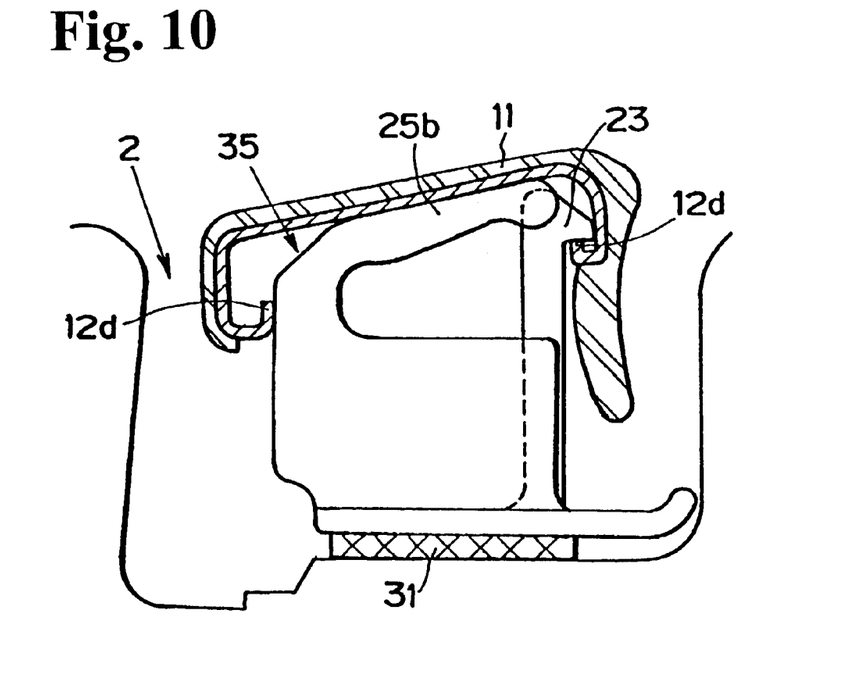
FIG. 10 is a view for explaining one of clips according to the third embodiment.
Figure 11:
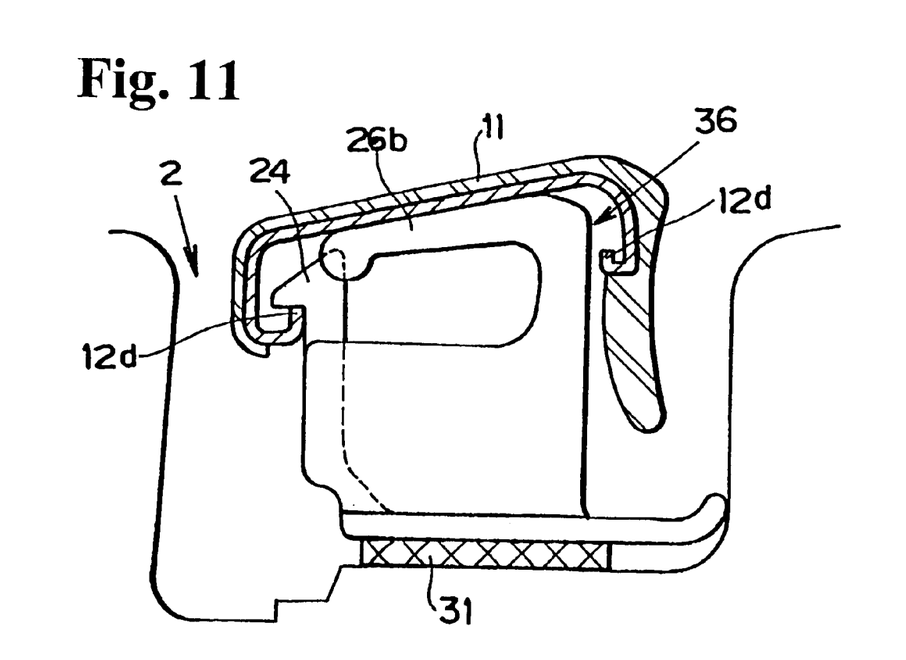
FIG. 11 is a view for explaining the other clip according to the third embodiment.

FIG. 9 shows the second embodiment of the invention, and FIGS. 10 and 11 show the third embodiment of the invention. In each of these embodiments, the same constituent members as in the first embodiment are denoted by the same reference numerals, to thereby omit the explanation thereof.

In the second embodiment shown in FIG. 9, an abutting piece section 32 includes a leg 33, and a pair of free ends 34a and 34b diverting from the leg 33. A pair of the free ends 34a and 34b mainly abuts against the inner surface of the top wall at both sides of the roof trim 11 in the width direction, and spring forces attributed to the pair of the free ends 34a and 34b can effectively increase the engagements between the trim side engaging sections 12d and the engaging sections 23 and 24 at both sides of the roof trim 11 in the width direction.

In the third embodiment, two types of clips 35 and 36 are used. As shown in FIG. 10, the clip 35 includes the engaging section 23 that engages one of the trim side engaging sections 12d and the free end 25b only, and does not have the engaging section 24 and the free end 26b as in the first embodiment. As shown in FIG. 11, the clip 36 includes the engaging section 24 that engages the other trim side engaging section 12d and the free end 26b only, and does not have the engaging section 23 and the free end 25b as in the first embodiment. Both the clips 35 and 36 are sequentially fixed to the groove section 2 with a predetermined interval therebetween in the extending direction of the groove section 2, and the engaging section 23 (24) of each clip 35 (36) engages one of the trim side engaging sections 12d at both sides of the roof trim 11 in the width direction while obtaining the effective force of the free end 25b (26b). Therefore, even though each clip 35 (36) does not have a pair of engaging sections and a pair of free ends, by using the clips 35 and 36, widthwise movement or displacement of the roof trim 11 in the groove section 2 can be restrained.

Although the embodiments of the invention have been explained above, the present invention is not limited thereto, and for example, the present invention can provide the following modifications (1) to (5).

(1) The trim 11 may not be inclined, and may be disposed substantially horizontally. Accordingly, the heights of the engaging sections 23 and 24, and the inclining angles of the free ends 25b and 26b are respectively equalized.

(2) The groove section 2 may be partially formed in the front and rear directions of the roof 1.

(3) The clip 21 can be bonded to the roof 1 without using the double-sided adhesive tape 31. Instead, the clip 21 can be bonded to the roof 1 by applying an adhesive when the clip is attached.

(4) The positioning section 27 may be formed at the both ends of the base plate 22 in the width direction. In this case, the width of the bottom wall section 2c of the groove section 2 is set to be the same size as the width of the base plate 22. However, in consideration of dimensional variations in the width of the groove section 2, it is preferable that the width of the base plate 22 is set smaller than the size of the bottom wall section 12c of the groove section 2 while the positioning section 27 is formed at one side of the width direction.

(5) The structure of attaching the trim 11 may be applied to a side body and a side door of an automobile, or a wall of a vehicle or building.

While the invention has been explained with reference to the specific embodiments of the invention, the explanation is illustrative and the invention is limited only by the appended claims.

What is claimed is:

1. A clip for attaching a cover member to cover a groove section, comprising:

a base plate to be attached to a bottom surface of the groove section, a pair of engaging sections projecting outwardly from one side of the base plate to be able to engage the cover member, one of the pair of the engaging sections having one engaging portion for engaging one edge of the cover member, and the other of the pair of the engaging sections having the other engaging portion for engaging the other edge of the cover member, and an abutting piece section projecting outwardly from the one side of the base plate and having a pair of abutting pieces to sandwich the pair of the engaging sections therebetween, each abutting piece having a free end, one free end of one abutting piece extending in a width direction of the clip from a side close to one of the engaging sections and the other free end of the other abutting piece extending in the width direction from a side close to the other of the engaging sections, said free ends extending outwardly from the base plate beyond the engaging sections corresponding thereto at the one side of the base plate for urging the cover member, when it is assembled with the clip, outwardly to restrain a movement thereof.

2. A clip for attaching a cover member according to claim 1, wherein said pair of the engaging sections is provided with an interval therebetween to allow one engaging section to engage one edge of the cover member and the other engaging section to engage the other edge of the cover member.

3. A clip for attaching a cover member according to claim 1, wherein one of the engaging sections has a height greater than that of the other of the engaging sections.

4. A clip for attaching a cover member according to claim 1, wherein said base includes an adhesive material for attaching the base to the groove section.

5. A clip for attaching a cover member to cover a groove section, comprising:

a base plate to be attached to a bottom surface of the groove section, a pair of engaging sections projecting outwardly from one side of the base plate to be able to engage the cover member, one of the pair of the engaging sections having one engaging portion for engaging one edge of the cover member, and the other of the pair of the engaging sections having the other engaging portion for engaging the other edge of the cover member, and an abutting piece section projecting outwardly from the one side of the base plate and having a leg and a pair of free ends diverting from the leg for allowing one of said free ends to abut against one inside wall of the cover member in a width direction of the clip, and the other of said free ends to abut against the other inside wall of the cover member in the width direction, said free ends extending beyond the engaging sections at the one side of the base plate for urging the cover member, when it is assembled with the clip, outwardly to restrain a movement thereof.

* * * * *